United States Patent [19]
Kawashima et al.

[11] 3,877,003
[45] Apr. 8, 1975

[54] WARNING SYSTEM FOR BELT SLIPPAGE

[75] Inventors: Isamu Kawashima, Aichi-ken, Japan

[73] Assignee: Nippon Soken, Inc., Nishio-shi, Aichi-ken; Toyota Jidosha Kogyo Kabushiki Kaisha, Toyota-shi, both of Japan

[22] Filed: Aug. 29, 1973

[21] Appl. No.: 392,777

[30] Foreign Application Priority Data
Sept. 9, 1972 Japan.............................. 47-90716

[52] U.S. Cl. ............. 340/268; 123/41.15; 307/123; 324/161; 340/52 R
[51] Int. Cl. ......................................... G08b 21/00
[58] Field of Search.................. 340/268, 52 R, 263; 324/161, 169; 307/123; 73/510; 123/41.15, 41.49, 198 D

[56] References Cited
UNITED STATES PATENTS
3,581,277  5/1971  Beatty, Jr. et al. ................. 340/268
3,673,400  6/1972  Ito...................................... 307/123

Primary Examiner—Glen R. Swann, III
Attorney, Agent, or Firm—Cushman, Darby & Cushman

[57] ABSTRACT

A shaft revolution detector detects the number of revolutions of the engine shaft of a vehicle engine, a driven member revolution detector for detecting the number of revolutions of a driven rotary member connected to the engine shaft through a belt, a circuit compares the detected signals of the driven member revolution detector and the shaft revolution detector, and actuates a warning circuit when the output signal of the comparator circuit reaches a predetermined value.

4 Claims, 2 Drawing Figures

WARNING SYSTEM FOR BELT SLIPPAGE

BACKGROUND OF THE INVENTION

1. Field of the Invention

The present invention relates to a system for detecting a slippage of a belt which drives a fan for cooling an internal combustion engine (hereinafter referred to as an "engine") installed in a vehicle and a vehicle battery charging generator (hereinafter referred to as an "alternator") and giving a warning.

2. Description of the Prior Art

In the past, the engine installed in an automotive vehicle has been employed to drive an engine cooling fan and an alternator or a driven rotary member through a fan belt. However, there has been a drawback in that if the fan belt slips, the fan cannot rotate satisfactorily with the result that not only the engine is overheated, but also the insufficient rotation of the alternator results in the undercharging of the battery.

SUMMARY OF THE INVENTION

With a view to overcoming the foregoing difficulty, it is an object of the present invention to provide a warning system for belt slippage wherein a detected signal corresponding to the number of revolutions of an engine is compared with a detected signal corresponding to the number of revolutions of a driven rotary member such as an alternator, whereby a warning is given when the difference between the two signals becomes greater than a predetermined value, thereby ensuring the detection and warning for a belt slippage and taking of a proper measure in response to the warning.

In accordance with the present invention, the system comprises a shaft revolution detector for detecting the number of revolutions of the engine shaft of an engine installed in a vehicle, a driven member revolution detector for detecting number of revolutions of a driven rotary member connected to the engine shaft through a belt for transmitting the rotation of the engine shaft, comparator means for comparing the detected signals of the driven member revolution detector and the shaft revolution detector, and warning means for giving a warning when the output signal of the comparator means reaches a predetermined value, and there is thus a great advantage in that the determination and detection of a slippage of the belt is effected from the fact that the slip ratio of the belt has reached a predetermined value and the warning means is actuated in response to this detection to give a warning so that when the warning is confirmed by the driver, he can take any necessary measure to prevent the vehicle engine from overheating or the battery from being undercharged due to the insufficient rotation of the cooling fan or the alternator caused by the belt slippage.

There is a further advantage in that the detection and comparison operations can be accomplished by means of digital circuits to thereby eliminate the adjustments of the circuits.

Description of the Preferred Embodiment

The present invention will now be described in greater detail with reference to the illustrated embodiment.

Figure 1:
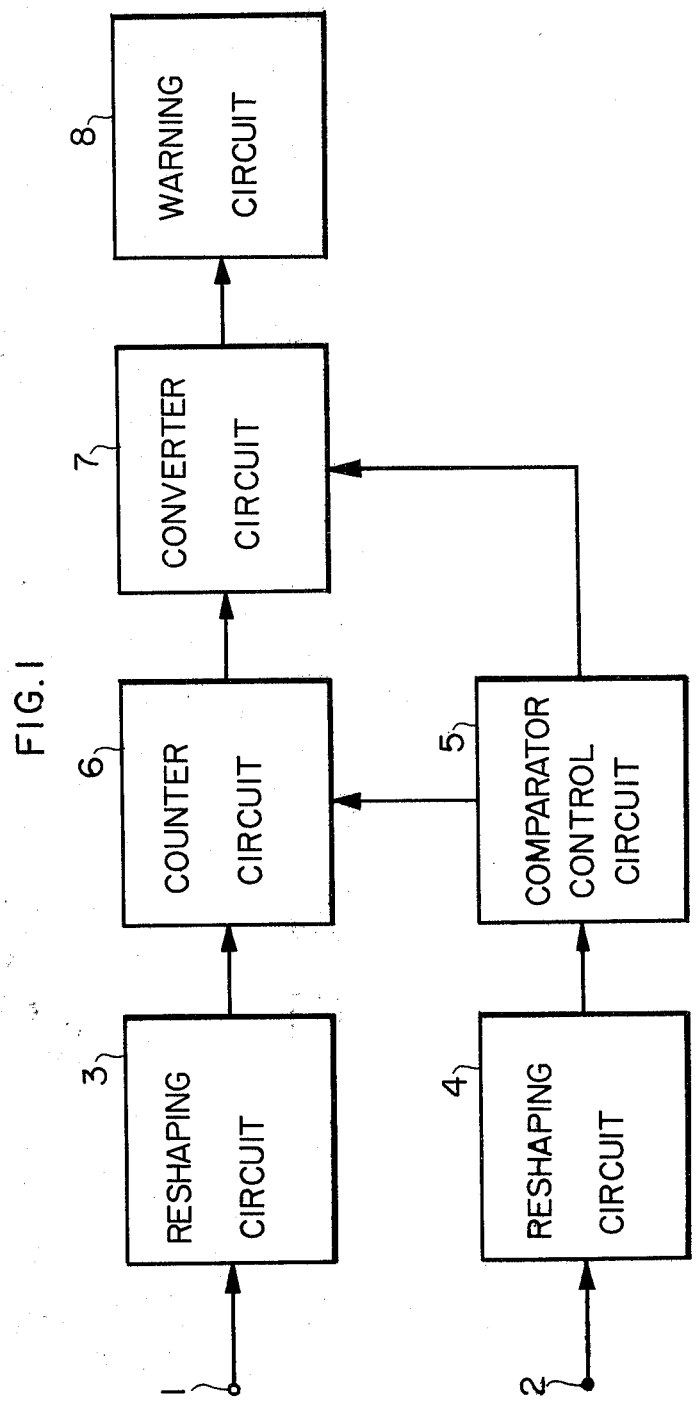
FIG. 1 is a block diagram showing an embodiment of a warning system for belt slippage according to the present invention.

Referring first to the block diagram of FIG. 1 showing the general schematic construction of the warning system of the present invention, numeral 1 designates a first input terminal to which is applied a first pulse signal having a frequency proportional to the number of revolutions of a driven rotary member or an alternator (not shown), 2 a second input terminal to which is applied a second pulse signal having a frequency proportional to the number of revolutions of the engine, 3 a first reshaping circuit for reshaping the first pulse signal, 4 a second reshaping circuit for reshaping the second pulse signal representing the engine revolution. A driven member revolution detector for detecting the number of revolutions of the alternator is provided by the first reshaping circuit 3 which reshapes the first pulse signal applied to the first input terminal 1, and a shaft revolution detector for detecting the number of revolutions of the engine is provided by the second reshaping circuit 4 which reshapes the second pulse signal applied to the second input terminal 2. Numeral 5 designates a comparator control circuit for receiving as its input the output signal of the second reshaping circuit 4 and generating a gating signal which determines the counting time for counting the number of pulses of the first pulse signal as well as a reset signal for the counting time. Numeral 6 designates a counter circuit for counting the pulses of the reshaped first pulse signal while the gate is opened by the gating signal and generating a pulse when its count becomes greater than a predetermined value, 7 a converter circuit for generating an output signal when the counter circuit generates a pulse, 8 a warning circuit for giving a warning when the output signal of the converter circuit 7 terminates. The comparator control circuit 5 and the counter circuit 6 constitute comparator means for comparing the detected signals of the detectors, and the converter 7 and the warning circuit 8 constitute warning means.

Figure 2:
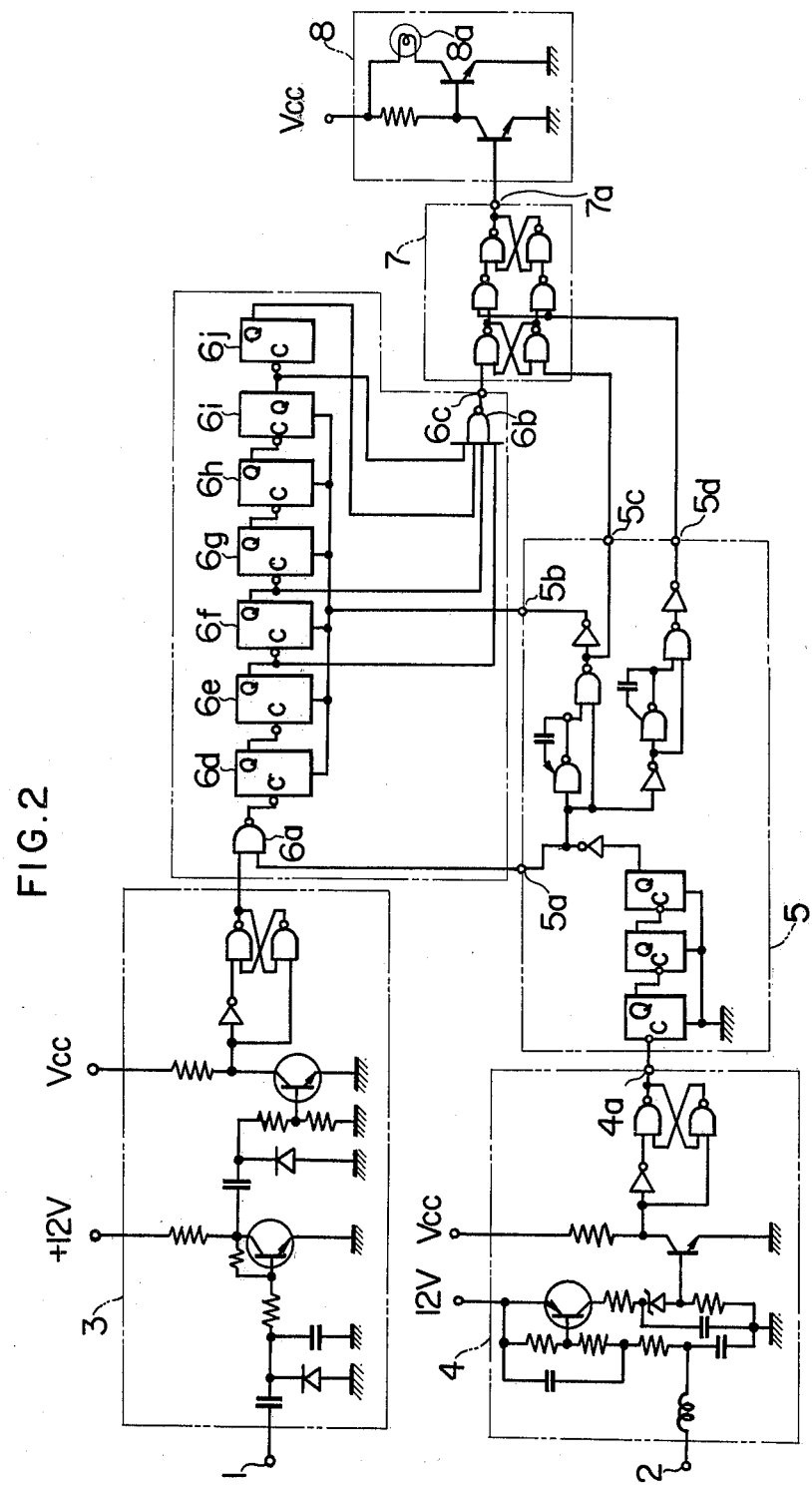
FIG. 2 is an electric wiring diagram showing one form of the detailed circuitry of the embodiment shown in FIG. 1.

Next, one form of the detailed circuitry for the block diagram of FIG. 1 will be described with reference to FIG. 2. The second pulse signal proportional to the number of revolutions of the engine and applied to the second input terminal 2 is reshaped by the reshaping circuit 4 into pulses having no chattering phenomenon and the reshaped pulses are delivered to an output terminal 4a. In the comparator control circuit 5 which receives the reshaped pulses, the pulses corresponding to the engine revolutions are subjected to frequency division so that a gating signal which determines the counting time is developed at a counter terminal 5a. In other words, when the counter terminal 5a has a "1" signal, the gate of the counter circuit 6 is opened to permit it to count the pulses of the first pulse signal. The comparator control circuit 5 also generates at a reset terminal 5b a reset pulse for resetting seven flip-flops 6d, 6e, 6f, 6g, 6h, 6i and 6j of the counter circuit 6, and conversion pulses necessary for the conversion by the converter circuit 7 are also generated at control terminals 5c and 5d. The gating signal generated at the gating terminal 5a is applied to a NAND gate 6a so that the number of pulses corresponding to the alternator revolutions are passed during the counting time when the NAND gate 6a is kept open. The transmitted pulses are counted by the counter comprising the seven flip-flops 6d, 6e, 6f, 6g, 6h, 6i and 6j so that whether the count is greater than a predetermined value is compared and determined in accordance with a pulse generated at an output terminal 6c of a NAND gate 6b. In other words, when the count is smaller than the predetermined value, the pulse is always a "1" signal, while it falls to a "0" signal when the count is greater than the predetermined value. Accordingly, the predetermined value can be selected as desired depending on which outputs of the flip-flops 6d, 6e, 6f, 6g, 6h, 6i and 6j constituting the counter are applied to the inputs of the NAND gate 6b. The pulse developed at the output terminal 6c is converted by the converter circuit 7 to produce an output signal at an output termianl 7a for verifying the normal operation. When the output signal is not produced a lamp 8a of the warning circuit 8 is turned on to generate an alarm.

With the construction described above, the operation of this embodiment is as follows. Assume now that the ratio between the engine revolutions and the alternator revolutions, i.e., the pulley ratio is set to 1.8 and the slip ratio is set to 80 percent when the number of revolutions of the engine is 1000 rpm. When the alternator revolutions are 1800 rpm, the number of pulses generated at the first input terminal 1 is $18 \times 1800/60$ pulses per second since 18 pulses are generated at an N terminal of the alternator a neutral terminal which is a common junction of Y-connected generator windings of the alternator for every rotation thereof. On the other hand, when the engine revolutions are 1000 rpm, the points of a distributor for providing signals at the second input terminal 2 generate two pulses for each revolution of the engine (in the case of a four-cycle, four-cylinder engine) and thus the number of pulses generated is $2 \times 1000/60$ pulses per second. Therefore, when the r.p.m. of the engine is 1,000 (r.p.m.) for example, the second pulse signal applied to the second input terminal 2 has pulses at the rate of $2 \times 1000/60$ (pulses/sec), i.e. 2000 pulses per minute. This pulse signal is then shaped by the pulse shaper circuit 4 to produce at its output a shaped signal at the rate of 1000/60 (pulses/sec). Since the shaped signal is frequency divided by the factor of 8, a gate signal whose duration corresponds to the time period during which the number of pulses of the shaped signal reaches 8 is produced at a counting terminal 5a.

On the other hand, in case of the absence of the belt slip, the first pulse signal at the rate of $18 \times 1800/60$ (pulses/sec) is shaped by the pulse shaper circuit 3 to produce the shaped signal at the rate of $9 \times 1800/60$ (pulses/sec) so that the number of pulses passed through the NAND gate 6a during the count time for said gate signal is given by $(9 \times 1800/60)/(1000/60/8) \approx 129$ pulses.

Accordingly, assuming that the allowable range of the slip rate for the belt is about 80 percent, it may be determined that a normal operation is being attained if the number of pulses passed through the NAND gate 6a within said count time is at least 102 and that an abnormal slip of the belt is occurring if the number of pulses does not reach 102.

The above determination may be effected at the same value even when the r.p.m. of the engine has any number other than 1000 Or.p.m.) as in the illustrated example. That is, since the r.p.m. of the alternator is 1.8 times as large as that of the engine and the number of pulses generated per revolution is 9 times as large as that for the engine and since the shaped signal of the second pulse signal associated with the r.p.m. of the engine is frequently divided by the factor of 8 to produce the gate signal on which the count time of the counter circuit 6 depends, the number of pulses passed through the NAND gate 6a within the count time when no slip of the belt exists is given by $1.8 \times 9 \times 8 \approx 129$ pulses, which is independent of the r.p.m. of the engine. Accordingly, when the allowable range of the slip rate of the belt is set to about 80 percent, it is only necessary to determine whether the number of pulses within said count time is not less than 102 or not.

As a result, when the slip rate of the belt is within an allowable reange, the counter 6 is reset by a reset signal produced at the reset terminal 5b at the time of the rise of said gate signal and the converter circuit 7 is set to its rest condition by a converting pulse supplied from the control terminal 5c. Since the number of pulses passed through the NAND gate 6a in response to the gate signal is at least 102, a "0" pulse is generated at the output 6c of the NAND gate 6b, which pulse is then stored by a preceding stage flip-flop in the converter circuit 7. Thereafter, at the time of the fall of the gate signal, in response to a converting pulse produced at the control terminal 5d, the stored signal in the preceding stage flip-flop is stored to a subsequent stage flip-flop producing a "1" signal at the output terminal 7a. Thus, the lamp 8a of the warning circuit 8 is not turned on, indicating a normal operation.

When the slip rate of the belt is shifted out of the allowable range, the number of pulses passed through the NAND gate 6b within the count time does not reach 102 so that the "0" pulse is not produced at the output terminal 6c of the NAND gate 6b and the "0" signal is produced at the output terminal 7a of the converter circuit 7. In response to the "b 0" signal the lamp 8a of the warning circuit 8 is turned on, indicating a warning. The above operation of determination is repeated for each cycle of the gate signal. Various other warning devices such as a buzzer may be used in plate of the lamp 8a.

While, in the embodiment described above, the detection of the engine revolutions and the revolutions of the driven rotary member or alternator as well as the comparison of the detected signals are effected by means of digital signals, these detection and comparison may be effected by means of analog signals.

I claim:
1. A warning system for belt slippage comprising a first revolution detector means for detecting the number of revolutions of a first rotary member, a second revolution detector means for detecting the number of revolutions of a second rotary member connected to said first rotary member through a belt for transmitting the rotation of said first rotary member, comparator means for comparing the detected signals of said first revolution detector and said second revolution detector said comparator means comprising first circuit means for accumulating a count of the detection signals from said first revolution detector to produce a repetition signal each time the accumulated value reaches a preset value, second circuit means for accumulating a count of the detection signals from said second revolution detector in response to said repetition signal from said first circuit and logic means for producing a first signal when the accumulated count in said second circuit means exceeds a predetermined value and a second signal when the count in said second circuit means is less than said predetermined value, and warning means for giving a warning when one of said signals is produced by said logic means and not giving a warning when the other of said signals is produced.

2. A warning system according to claim 1 wherein said warning means comprises a converter circuit means for storing the first and second signals and causing the conversion of the stored signal to occur in synchronism with the repetition signal, and a warning circuit for generating and removing a warning in response to the stored signal in said converter circuit.

3. A warning system for belt slippage comprising:
first revolution detector means for generating a pulse signal of a frequency proportional to the r.p.m. of a first rotary member,
second revolution detector means for generating a pulse signal of a frequency proportional to the r.p.m. of a second rotary member linked through a belt to transmit the rotation of said first rotary member,
frequency divider circuit means for repetitively frequency dividing the pulse signal from said first revolution detector by a constant factor,
counter circuit means for counting the pulse signal from said second revolution detector for each cycle of the output signal of said frequency divider circuit and determining whether the count thereof is at least equal to a predetermined value or not, and
warning means responsive to the determination result of the counter circuit for generating and removing a warning.

4. A warning system according to claim 3 wherein said warning means comprising converter circuit means for storing the result of the determination by said second circuit and causing the conversion of the stored signal to occur in synchronism with the repetition signal, and warning circuit means for generating and removing a warning in response to the stored singal in said converter circuit.

* * * * *